United States Patent [19]
Vanotti

[11] 4,085,652
[45] Apr. 25, 1978

[54] SCREW FIXING DEVICE FOR STRUCTURAL UNITS OF AGGLOMERATED MATERIAL

[75] Inventor: Guy Vanotti, Oyonnax, France

[73] Assignee: Etablissements Vape, Oyonnax, France

[21] Appl. No.: 699,480

[22] Filed: Jun. 24, 1976

[30] Foreign Application Priority Data

Jun. 25, 1975 France .................. 75 19908

[51] Int. Cl.² ............................................. F16B 37/04
[52] U.S. Cl. ......................................... 85/83; 151/41.7
[58] Field of Search .............. 85/82, 83, 63, 64; 151/41.7

[56] References Cited

U.S. PATENT DOCUMENTS

| 808,401 | 12/1905 | Percival | 85/63 X |
|---|---|---|---|
| 1,057,975 | 4/1913 | Newhall et al. | 85/83 |
| 1,138,219 | 5/1915 | Hottenroth | 85/83 |
| 1,168,770 | 1/1916 | Wagner | 85/83 |
| 1,570,234 | 1/1926 | Feldmar | 85/63 |
| 2,573,498 | 10/1951 | Scott | 85/82 |
| 2,718,485 | 9/1955 | Samuely | 151/41.7 |
| 3,434,261 | 3/1969 | Rohe | 151/41.7 X |
| 3,621,557 | 11/1971 | Cushman et al. | 151/41.7 X |
| 3,783,921 | 1/1974 | Wagner | 85/82 X |
| 3,897,713 | 8/1975 | Gugle | 151/41.7 X |

FOREIGN PATENT DOCUMENTS

| 1,575,163 | 7/1969 | France | 85/83 |
|---|---|---|---|
| 908,531 | 4/1954 | Germany | 85/82 |

*Primary Examiner*—Roy D. Frazier
*Assistant Examiner*—Rodney H. Bonck
*Attorney, Agent, or Firm*—Fleit & Jacobson

[57] ABSTRACT

A screw fixing device for a structural member of agglomerated material, e.g. of plaster or concrete, comprising a member for accomodating the screw integrated to said structural member at the moment of manufacturing the latter, characterized in that said member is constituted by an anchoring sheath of plastic material, adapted to insulate the screw completely from the remaining portions of said member.

2 Claims, 7 Drawing Figures

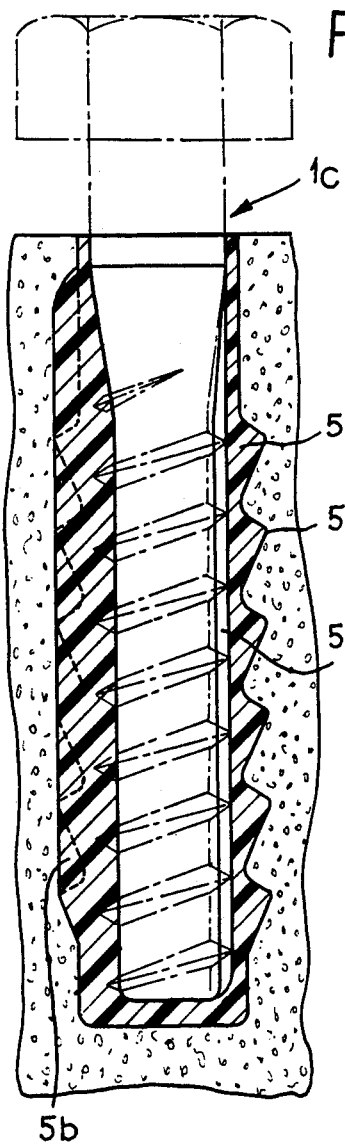
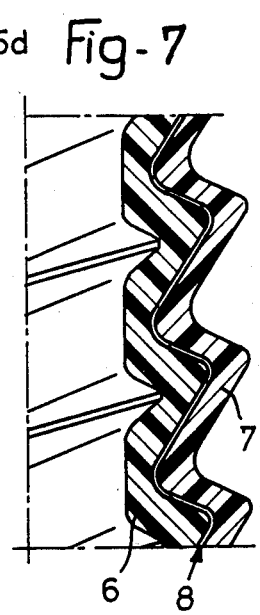
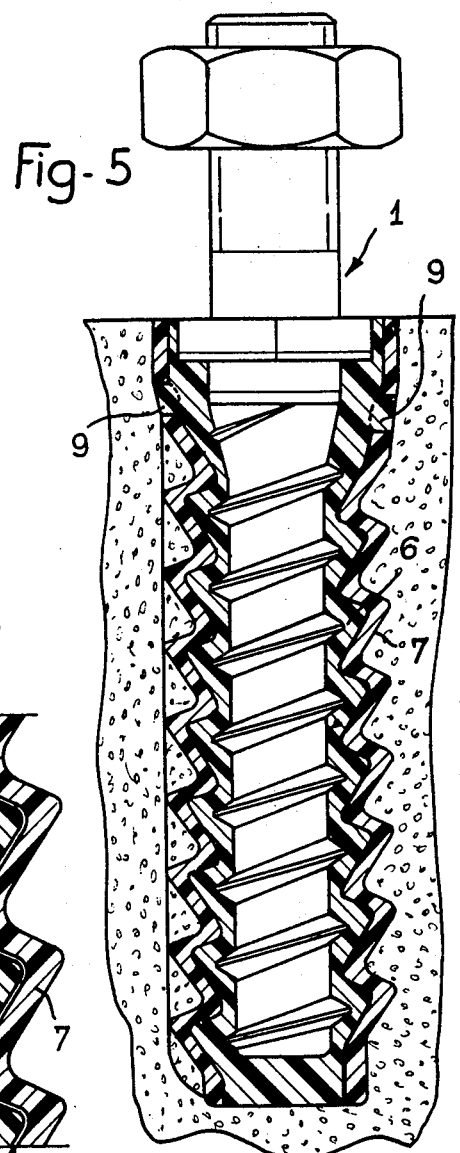
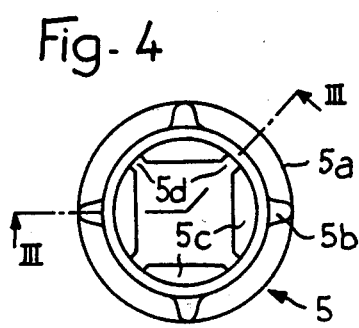
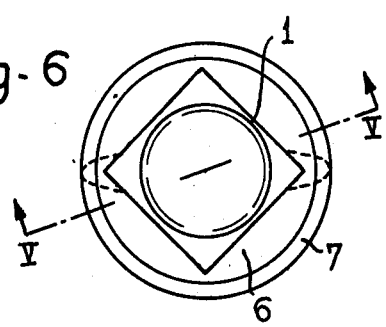

SCREW FIXING DEVICE FOR STRUCTURAL UNITS OF AGGLOMERATED MATERIAL

The known methods for mounting a screw fixing device in structural units of agglomerated material, e.g. of plaster or concrete, usually comprise embedding the fixing screw or using clamping inserts adapted to accomodate said screw, which often entails difficult operating steps, either during their manufacture or when they are being installed, and moreover sets problems not only when strength requirements have to be met, but also whenever electrical insulation and a protection against moisture or corrosion, and contingently a renewal of the fixing device, are desired.

The present invention relates to a screw fixing device for any structural unit of agglomerated material, capable of overcoming the above problems in a simple way.

To this end, the screw fixing device according to the invention for a structural unit of agglomerated material, e.g. of plaster or concrete, comprising a member for accomodating the screw made integral with the structural unit at the moment of its manufacture, is characterized in that said member is constituted by an anchoring sheath of plastic material adapted to insulate the screw completely from the remaining portions of said member.

The invention also covers various arrangements or specific embodiments, and in particular those in which said anchoring sheath is moulded onto the screw and integrated therewith in the structural unit;

those in which said anchoring sheath comprises a passage for receiving the screw provided with a free space for accomodating the sheath-material expansion;

those in which said anchoring sheath is formed of two parts, viz one inner part moulded onto the screw, and an outer part surrounding the inner part and so shaped as to be retained from moving axially with respect therewith and to leave a free space for accomodating the sheath material expansion; the invention also relates to a method for manufacturing such a two-part sheath.

More specifically, the invention relates to the use of such a screw fixing device for mounting sleeper-screws in railway sleepers of concrete.

In particular, the screw itself can serve as a clamping member, or it can be a screw-bolt adapted to receive a nut acting as the clamping member.

Various embodiments of a screw fixing device according to the invention will be described hereafter by way of example, as applied to the mounting of a sleeper-screw in a railway sleeper of concrete, with reference to the enclosed drawing, wherein:

FIG. 3 is an axial cross-section along line III-III of FIG. 4 of another embodiment of a sleeper-screw sheath integrated to a concrete sleeper;

FIG. 4 is an upper plan view of the sheath shown in FIG. 3;

FIG. 5 is an axial cross-section along line V—V of FIG. 6 of another device for fixing a sleeper-screw in a concrete sleeper;

FIG. 6 is an upper plan view of the screw-sheath unit of FIG. 5, with the nut removed; and FIG. 7 is an enlarged detail view of the two-part sheath shown in FIG. 5.

Figure 1:
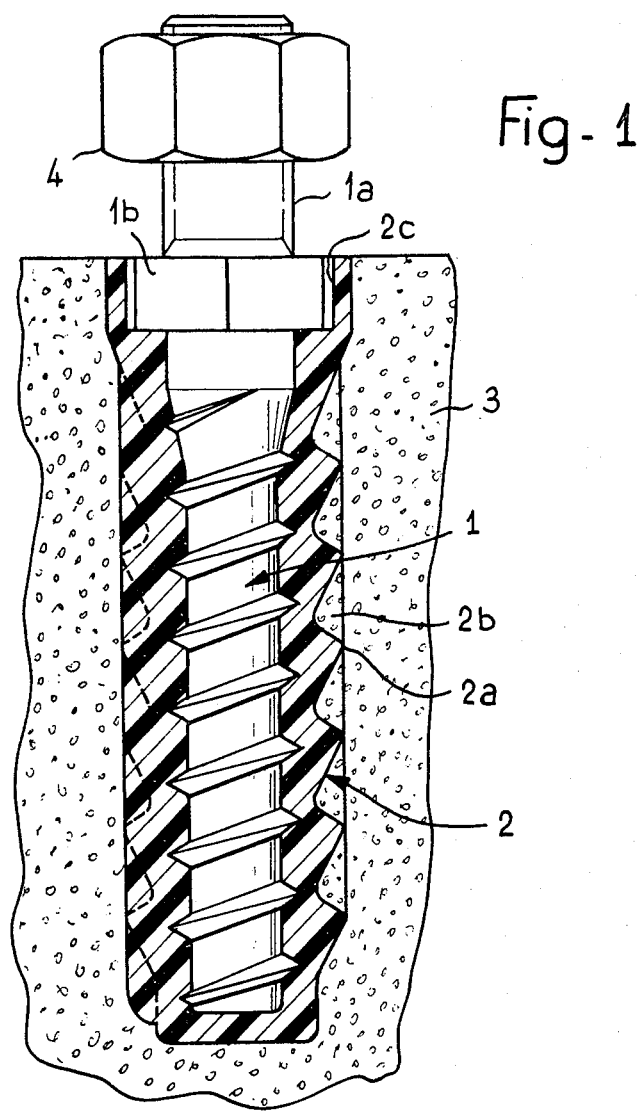
FIG. 1 is an axial cross-section of a device for fixing a sleeper-screw in a sleeper of concrete, along line I-I of FIG. 2.
Figure 2:
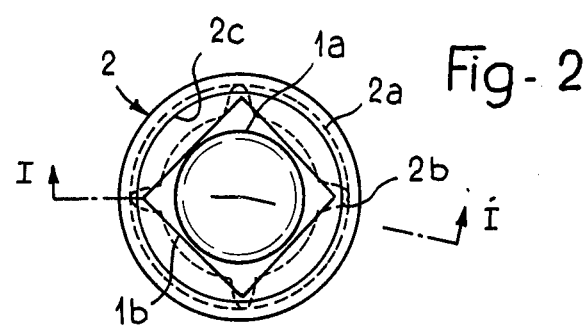
FIG. 2 is an upper plan view of the screw-sheath unit of FIG. 1, with the nut removed.

The sleeper-screw as shown in FIG. 1 comprises a conventional thick-threaded screw 1 from which is moulded a sheath 2 of plastic material acting as screw-cover. That sheath, which is adapted to be embedded at a selected position, with the screw contained therein, in a sleeper 3 of concrete at the moment of casting the latter, is provided, on its outer surface, with anchoring protrusions, or unevennesses, comprising, in the present instance, circular ribs 2a for preventing the sheath from moving axially, on the one hand, and axial ribs 2b (four in number, in the present case) adapted to prevent the sheath from rotating in the concrete, on the other hand.

Screw 1, in the present instance, is a screw-bolt provided, at the end thereof not wrapped in the sheath, with an externally threaded rod 1a adapted to accomodate a clamping-nut 4 intended to cooperate with the conventional lower flange of a rail so as to immobilize the latter on the sleeper. Screw 1 also comprises a flange 1b of square cross-section in a circular inlet 2c, on larger cross-section of the sheath, so that, by means of a socket wrench of mating square cross-section, screw 1 proper can, if needed, be unscrewed so as to be replaced by a new one or with a view to renewing the whole device. In this respect, use may be made, at the moment of moulding the sheath onto the screw, of an anti-adhesive composition (e.g. containing a silicone) applied as a coating on the screw.

Quite obviously, as a variant, the screw can be constituted, in the present instance, by a conventional sleeper-screw or any equivalent up-screw, the clamping function of which is fulfilled by screwing it into sheath 2.

FIGS. 3 to 7 relate to embodiments more specially adapted to prevent any undesirable effect of the plastic material expansion, capable of generating cracks in the structural unit, depending on the nature of the materials used and on their conditions of use.

The embodiment of FIGS. 3 and 4 consists in using a sheath 5 provided, as above, with anchoring unevennesses in the form of circular (5a) and axial (5b) ribs, the sheath inner profile forming a passage for accomodating the screw, constituted in the present instance by four axial ribs 5c, into which the screw-threads are to be force fitted, said ribs leaving therebetween four free grooves 5d for accomodating the sheath material expansion.

Such an arrangement, moreover, easily lends itself to accomodate the pitch differences at the moment of screwing, since, in this case, the sheath may be integrated alone to the concrete sleeper while the latter is being cast, the sleeper-screw being screwed in a later step. By way of example, the figures show, in dash-and-dot, a conventional sleeper-screw 1c with a clamping-head integral with the screw.

The embodiment according to FIGS. 5 to 7 consists in using an anchoring sheath made of two parts, viz an inner part 6 moulded onto the screw, and an outer part 7 surrounding part 6 with a slight clearance 8 for accomodating the sheath material expansion, said two parts being so shaped as to be restrained from moving axially with respect to each other.

In the present instance, the interlocking of parts 7 and 6 of the sheath is of the helical type, with a clearance 8 of at least one tenth of a millimeter in the case of a railway sleeper-screw.

A method for manufacturing such a two-part sheath comprises the steps of, first, casting the outer part 7 of the sheath, inserting screw 1 into said outer part 7, reducing the latter, e.g. by a stren ous clamping action in a mould in which is, thereafter, moulded onto screw 1 the sheath inner part 6 in the outer part 7 provisionally reduced, an anti-adhesive composition being, contingently, applied on the inner wall of the outer part 7. The whole assembl thus obtained can be integrated as such to the concrete sleeper while the latter is being cast. It will be noted that a rotating connection has been provided between the sheath parts 6 and 7, said connection consisting of lugs 9 moulded onto the sheath. Thus, parts 6 and 7 are normally maintained at a predetermined relative position, until the device is clamped, thus engaging the mating upper helical sides of the two parts of the sheath. However, if needed, such an arrangement permits to extract the sleeper-screw 1 integral with its sheath part 6, by unscrewing the 1-6 assembling under such a stress that lugs 9 are caused to be sheared. It is thus possible to substitute a new sleeper-screw 1 with a sheath corresponding to part 6.

Quite obviously, other embodiments can be contemplated within the scope of the invention.

What is claimed is:

1. A screw-fixing device intended to be integrated in a structural member of agglomerated material, such as plaster or concrete, at the moment of manufacturing of said agglomerated material, comprising a screw and an anchoring sheath adapted to be integrated in said structural member, said anchoring sheath being made of two parts of plastic material, the first part comprising an inner part moulded onto the screw, the second part comprising an outer part surrounding said inner part, said inner and outer parts being shaped so as to be restrained from moving axially with respect to each other, and having a free space between said two parts for accommodating expansion of said sheath material, an outer surface of the inner part and an inner surface of the outer part being provided with helical interlocking structure, said restraint from axial movement being provided by said helical interlocking structure of said inner and outer parts, permitting contingently to unscrew and replace the screw with said inner part of the sheath moulded thereto.

2. A screw fixing device intended to be integrated in a structural member of agglomerated material, such as plaster or concrete, as the moment of manufacturing of said agglomerated material, comprising a screw and an anchoring sheath adapted to be integrated in said structural member, said anchoring sheath being made of two parts of plastic material, the first part comprising an inner part moulded onto the screw, the second part comprising an outer part surrounding said inner part, an outer surface of the inner part and an inner surface of the outer part having complementary protruding surfaces so as to be interlocking and restrained from moving axially with respect to each other, and having a free space between said protruding surfaces for accommodating expansion of said sheath material.

* * * * *